(12) United States Patent
Shue et al.

(10) Patent No.: US 6,222,845 B1
(45) Date of Patent: *Apr. 24, 2001

(54) SYSTEM AND METHOD FOR PROVIDING UNITARY VIRTUAL CIRCUIT IN DIGITAL NETWORK HAVING COMMUNICATION LINKS OF DIVERSE SERVICE TYPES

(75) Inventors: Chikong Shue, Andover; Jonathan B. West, Northborough; James A. Martel, Wellesley, all of MA (US)

(73) Assignee: Cascade Communications Corp., Westford, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,583

(22) Filed: Feb. 25, 1997

(51) Int. Cl.[7] .............................. H04L 12/28; H04L 12/56

(52) U.S. Cl. ........................ 370/400; 370/409; 370/466

(58) Field of Search ................................. 370/395, 396, 370/397, 410, 466, 465, 470, 400, 409

(56) References Cited

U.S. PATENT DOCUMENTS

| | | | |
|---|---|---|---|
| 5,315,588 | * | 5/1994 | Kajiwara et al. ..................... 370/395 |
| 5,490,140 | * | 2/1996 | Abensour et al. .................... 370/397 |
| 5,490,141 | * | 2/1996 | Lai et al. ............................. 370/397 |

* cited by examiner

Primary Examiner—Ajit Patel
(74) Attorney, Agent, or Firm—Weingarten, Schurgin, Gagnebin & Hayes

(57) ABSTRACT

A network for transferring information among a plurality of digital devices includes a plurality of switching nodes interconnected by communication links. Each of the digital devices is connected to one of the switching nodes over additional ones of communication links. Each communication link transfers information in a predetermined one of a plurality of types of communications services, with the network including at least one communication link of each service type. The digital devices and switching nodes transfer information through the network over virtual circuits, with each virtual circuit extending from one digital device, as an originating digital device, to another digital device, as a terminating digital device. Each virtual circuit defines a unitary virtual circuit path extending through at least one switching node over a plurality of the communication links without regard to the service type of the ones of the communication links included in the virtual circuit path.

6 Claims, 10 Drawing Sheets

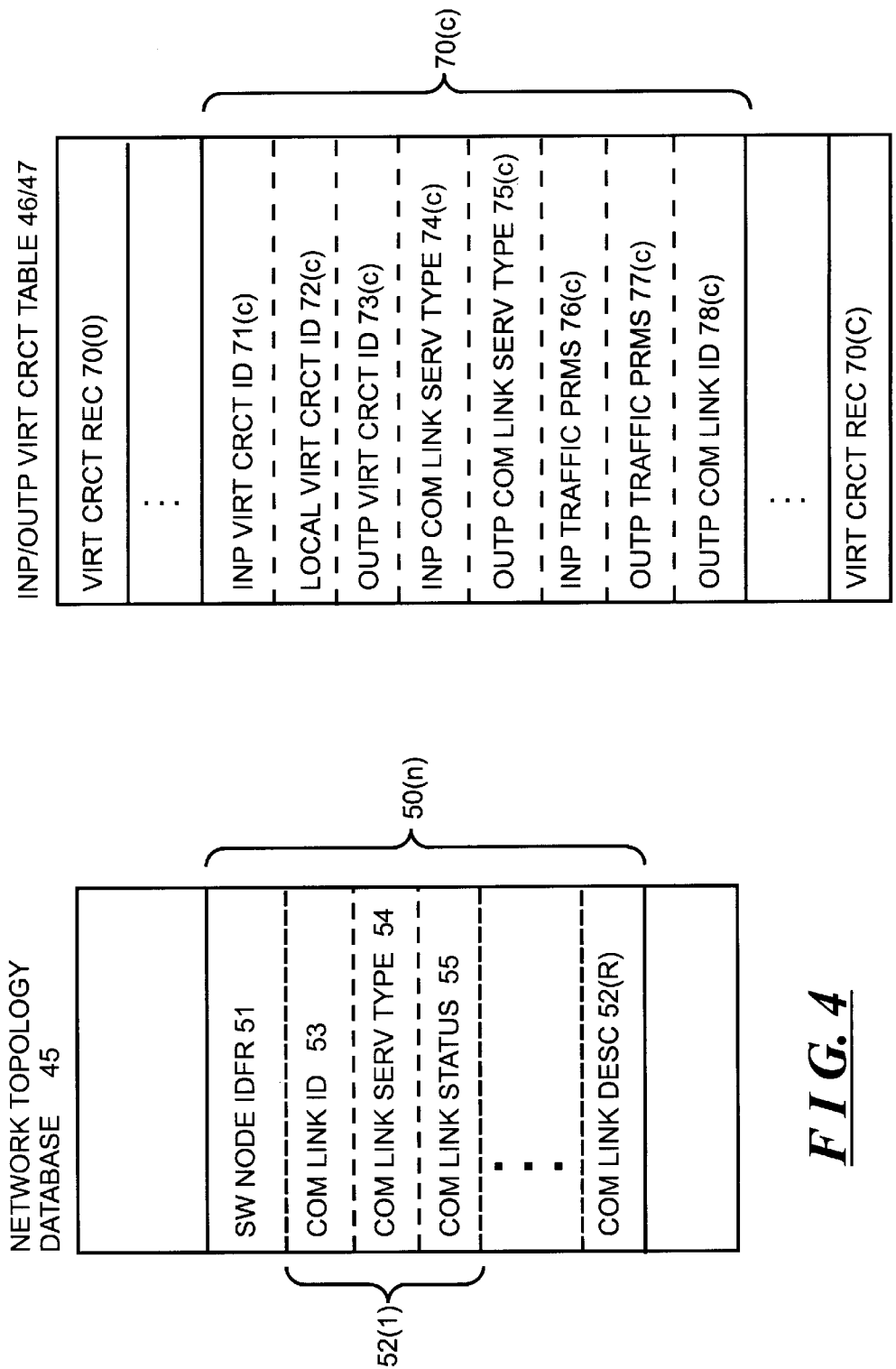

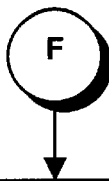

FIG. 6E

124. EACH SUCCESSIVE SWITCHING NODE ALONG THE PATH WILL RECEIVE THE ACKNOWLEDGE MESSAGE GENERATED BY THE SWITCHING NODE CONNECTED TO THE DESTINATION CUSTOMER PREMISES EQUIPMENT AND PERFORM OPERATIONS SIMILAR TO THOSE DESCRIBED ABOVE IN CONNECTION WITH STEPS 122 AND 123 TO FORWARD THE ACKNOWLEDGE MESSAGE AND, IF THE ACKNOWLEDGMENT REJECTED ESTABLISHMENT OF THE VIRTUAL CIRCUIT, ERASE THE ENTRIES 70(c) ESTABLISHED FOR THE VIRTUAL CIRCUIT IN THEIR RESPECTIVE INPUT AND OUTPUT VIRTUAL CIRCUIT TABLES 46 AND 47.

125. ORIGINATING SWITCHING NODE RECEIVES THE ACKNOWLEDGMENT MESSAGE DETERMINES WHETHER ACKNOWLEDGMENT MESSAGE REJECTS ESTABLISHMENT OF THE VIRTUAL CIRCUIT, AND IF SO WILL ERASE THE ENTRIES 70(c) ESTABLISHED FOR THE VIRTUAL CIRCUIT IN THEIR RESPECTIVE INPUT AND OUTPUT VIRTUAL CIRCUIT TABLES 46 AND 47

126. ORIGINATING SWITCHING NODE WILL NOTIFY THE REQUESTER WHICH REQUESTED ESTABLISHMENT OF THE VIRTUAL CIRCUIT OF THE CONFIRMATION OR REJECTION OF THE ESTABLISHMENT OF THE VIRTUAL CIRCUIT

SYSTEM AND METHOD FOR PROVIDING UNITARY VIRTUAL CIRCUIT IN DIGITAL NETWORK HAVING COMMUNICATION LINKS OF DIVERSE SERVICE TYPES

INCORPORATION BY REFERENCE

"Frame Relay/ATM PVC Service Interworking Implementation Agreement FRF-8," Frame Relay Forum Technical Committee, Apr. 14, 1995, a copy of which is attached hereto as Appendix A, incorporated by reference.

Appendix A of B-ICI Specification, Version 1.1, September 1994, entitled "Initial Guidelines For FRS Traffic Characterization At The B-ICI," The ATM Forum, a copy of which is attached hereto as Appendix B, incorporated by reference.

FIELD OF THE INVENTION

The invention relates generally to the field of digital network systems, and more particularly to systems and methods for providing a unitary virtual circuit in a digital network having communication links of diverse service types. In one embodiment, the invention provides a system and method for providing a unitary virtual circuit in a digital network having communication links of the frame relay and ATM service types, avoiding the necessity of providing separate virtual circuits over the respective frame relay and ATM portions of the network.

BACKGROUND OF THE INVENTION

Digital networks have been developed to facilitate the transfer of information, including data and programs, among digital computer systems and numerous other types of devices. A variety of types of networks have been developed and implemented using diverse information transfer methodologies. In modern networks, information is transferred through a mesh of switching nodes which are interconnected by communication links in a variety of patterns. The mesh interconnection pattern can allow for a number of paths to be available through the network from each computer system or other device which may transmit information as a source device, to another computer system or other device, which is to receive the information as a destination device, so that if congestion develops in particular regions of the network, or if components of the network become inoperative, information can be routed around the congested or inoperative portion of the network.

Information transferred from a source device to a destination device is generally transferred in the form of fixed- or variable-length packets, which are transferred through the network in accordance with several general packet transfer methodologies. In one packet transfer methodology, which is typically used in, for example, frame relay or ATM ("asynchronous transfer mode") networks, packets are transferred through the network's switching nodes over constructs which are generally termed "virtual circuits," "virtual connections" and the like (generally, "virtual circuits"). When a source device wishes to transfer information to a destination device, initially a preliminary operation will be performed to establish a virtual circuit over communication links defining a path from the source device, through a series of switching nodes to the destination device. Each switching node in the virtual circuit methodology is provided with a virtual circuit database that associates each of the virtual circuits maintained by the respective switching node with a particular one of the communication links over which packets associated with the respective virtual circuits are to be transmitted, either to the next switching node in the virtual circuit, or to the destination device to receive the packet.

After a virtual circuit is established, the source device can transfer packets using the virtual circuit database Each packet includes, as well as the data to be transferred, an identifier that identifies the particular virtual circuit to be used in transferring the packet. The source device will initially transfer the packet to the switching node connected thereto, and that switching node will use virtual circuit identifier and the virtual circuit database to identify a communication link over which it (that is, the switching node) is to transfer the packet. These operations will be performed for each switching node along the path of the virtual circuit. When the last switching node along the virtual circuit receives the packet, that switching node will transfer the packet to the particular destination device associated with the virtual circuit. These operations will be repeated for each of the packets transferred from the source device to the destination device. In addition, similar operations may also be performed in connection with packets which the destination device may transfer to the source device, since a single virtual circuit, once established, may be used to transfer packets in both directions between the original source device and the original destination device.

At the end of a communications session between the source device and the destination device over a virtual circuit, during which one or a number of packets may be transferred, the devices may close the virtual circuit. In that operation, packets are transferred between the source and destination devices which, among other things, can enable the switching nodes along the virtual circuit to expunge the virtual circuit information relating to the particular virtual circuit being closed from their respective virtual circuit databases. Thereafter, the virtual circuit identifier and other resources, including the entries in the respective virtual circuit databases associated with the closed virtual circuit, can be used for other virtual circuits.

There are a number of differences between the frame relay and ATM methodologies. The most apparent difference is that virtual circuit packets in the frame relay methodology are of variable length, and can accommodate blocks of data ranging in size from relatively small to relatively large numbers of bytes. On the other hand, ATM cells (as the packets are referred to in the ATM methodology) are of fixed and relatively small length, each comprising fifty-three bytes including a five-byte header portion and a forty-eight byte data portion. In addition, the ATM methodology defines a number of "quality of service" types, which can be used to indicate, for example, the amount of burst and continuous bandwidth will be allotted and guaranteed for a particular virtual circuit through the ATM network. There are a number of benefits of using each of the types of methodologies, and a number of networks have been established using each methodology. It is also desirable to be able to integrate networks which make use of the both packet transfer methodologies, so that, for example (i) source devices which are connected to one type of network can communicate with destination devices which are connected to the other type of network and (ii) if both the source device and the destination device are connected to a network of the same type, but if the shortest path between them is through a network of a different type, they can perform transfers over the shortest path through that different type network.

The current methodology for integrating frame relay and ATM networks is described in Appendix A identified above.

In that methodology, separate virtual circuits will be established through each leg of the path between the source device and the destination device, with each leg passing through a frame relay or ATM network. At the interface between the two networks, an "inter-working function" ("IWF") is used to convert between protocols of the respective service types. One problem that arises in this methodology, however, this methodology, is that the separate virtual circuits through the frame relay and ATM networks must be separately established, concatenated and managed, which complicates communications between source and destination devices.

SUMMARY OF THE INVENTION

The invention provides a new and improved system and method for providing a unitary virtual circuit in a digital network having communication links of diverse service types, for example, in a digital network having communication links of the frame relay and ATM service types, so as to avoid the necessity of providing separate virtual circuits over portions of the network having communication links of the respective service types.

In brief summary, the invention provides a network for transferring information among a plurality of digital devices includes a plurality of switching nodes interconnected by communication links. Each of the digital devices is connected to one of the switching nodes over additional ones of communication links. Each communication link transfers information in a predetermined one of a plurality of types of communications services, with the network including at least one communication link of each service type. The digital devices and switching nodes transfer information through the network over virtual circuits, with each virtual circuit extending from one digital device, as an originating digital device, to another digital device, as a terminating digital device. Each virtual circuit defines a unitary virtual circuit path extending through at least one switching node over a plurality of the communication links without regard to the service type of the ones of the communication links included in the virtual circuit path.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 4 and 5 depict details of various data structures useful in understanding the operation of the switching node depicted in FIG. 3.

DETAILED DESCRIPTION OF AN ILLUSTRATIVE EMBODIMENT

Figure 1:
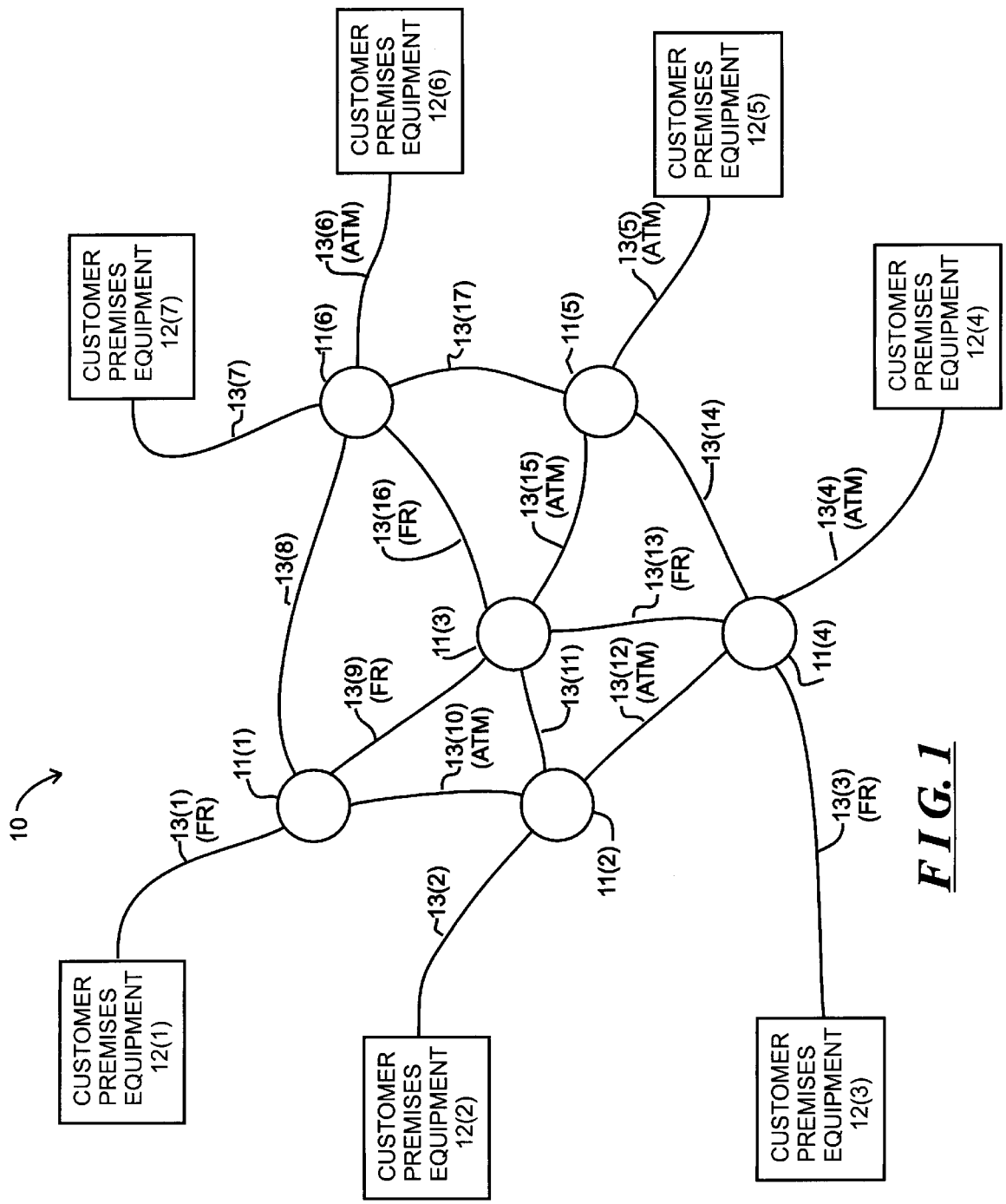
FIG. 1 schematically depicts a computer network, constructed in accordance with the invention, for transferring information using virtual circuits which integrate a plurality of diverse types of communications services.

FIG. 1 schematically depicts a computer network 10 including a plurality of switching nodes 11(1) through 11(N) (generally identified by reference numeral 11($n$)) for transferring signals representing data among a number of devices, which in FIG. 1 are represented by customer premises equipment 12(1) through 12(M) (generally identified by reference numeral 12($m$)) in a wide area network ("WAN"). The customer premises equipment 12($m$), as is conventional, may connect a particular device, such as a computer system or other device that stores, generates, processes or otherwise uses digital data, a local area network of such devices, or the like (not separately shown) to the wide area network 10. As is conventional, the customer premises equipment 12($m$) may comprise, for example, such components as frame relay access devices ("FRADs"), ATM access devices ("AADs"), multiplexers, concentrators or other devices for interconnecting digital devices E1 or LANs to a WAN.

Each customer premises equipment 12($m$) is connected over a communication link, generally identified by reference numeral 13($p$), to a switching node 11($n$) to facilitate transmission of data lie thereto or the reception of data therefrom. The switching nodes 11($n$) are interconnected by communication link, also generally identified by reference numeral 13($p$) to facilitate the transfer of information among the respective switching nodes 11($n$). The communication links 13($p$) may utilize any convenient information transmission medium, including, for example, wires for carrying electrical signals, optical fiber links for carrying optical signals, and so forth. Each communication link 13($p$) is preferably bi-directional, allowing the switching nodes 11($n$) to transmit and receive signals among each other and with customer premises equipment 12($m$) connected thereto over the same link; depending on the particular type of medium selected for respective communication links 13($p$), multiple media may be provided for transferring signals in opposite directions.

The invention provides an arrangement for facilitating the transfer of information from each of the respective customer premises equipment 12($m$), as respective source customer premises 12($m_S$) (subscript "S" referencing "source"), to others of the customer premises equipment as respective destination customer premises equipment 12($m_D$) (subscript "D" referencing "destination"), over the switching nodes 11($n$), where the communication links 13($p$) interconnecting the switching nodes 11($n$) are of different service types. In one embodiment, some of the communication links 13($p$) which interconnect the switching nodes 11($n$) transfer information using the "frame relay" type of communication service, over which information, in the form of variable-length frame packets, is transferred over virtual circuits established thereover using, and others of the communication links 13($p$) transfer information using the "ATM" communication type of communication service, over which information, in the form of fixed-length ATM cells, is transferred over virtual circuits established thereover. In the illustrative network depicted in FIG. 1, communication links 13($p$) which transfer information using the frame relay type of communication service are indicated by the legend "(FR)" underneath the respective reference numeral, and communication links 13($p$) which transfer information using he ATM type of communication service are indicated by the legend "(ATM)" underneath the respective reference numeral. The invention facilitates such transfers by establishing single virtual circuit through switching nodes 11($n$) and over the communication links 13($p$) comprising the network 10, over which packets for the respective types of communications services are transferred. If a switching node 11($n$) receives packets for a particular virtual circuit over a communication link which uses one type of communications service, for transfer over a communication link which uses the other type of communications service, it (that is, the switching node 11(n) will perform a conversion operation to convert one or more packets from that defined by the communication link over which the packets were received for the virtual circuit, to that defined by the communication link over which the packets are to be transmitted for the virtual circuit. After the conversion, the switching node 11(n) will transmit the converted packet(s) over the communication link which packets are to be transmitted for the virtual circuit.

Operations performed by the customer premises equipment 12(m) and switching nodes 11(n) in connection with transfer of message packets through the network 10 will be described in connection with a number of illustrative examples, for the following information-transfer scenarios:

(i) customer premises equipment 12(1) and 12(5) transmit information therebetween, with customer premises equipment 12(1) using frame virtual circuit packets and customer premises equipment 12(5) using ATM cells, with an intermediate switching node 11(3) along the path therebetween performing a conversion between frame virtual circuit packets and ATM cells;

(ii) customer premises equipment 12(1) and 12(4) transmit information therebetween, with customer premises equipment 12(1) using frame virtual circuit packets and customer premises equipment 12(5) using ATM cells, with a switching node 11(n) connected to one of the customer premises equipment (in this illustrative example, switching node 11(1) connected to customer premises equipment 12(1)) performing a conversion between frame virtual circuit packets and ATM cells;

(iii) customer premises equipment 12(1) and 12(3) transmit information therebetween, with both customer premises equipment 12(1) and 12(3) using frame packets, and at least a portion of the path through the switching nodes 11(n) therebetween using ATM cells; and (iv) customer premises equipment 12(4) and 12(6) transmit information therebetween, with both customer premises equipment 12(4) and 12(6) using ATM cells, and at least a portion of the path through the switching nodes 11(n) therebetween using frame virtual circuit packets.

Figure 6:
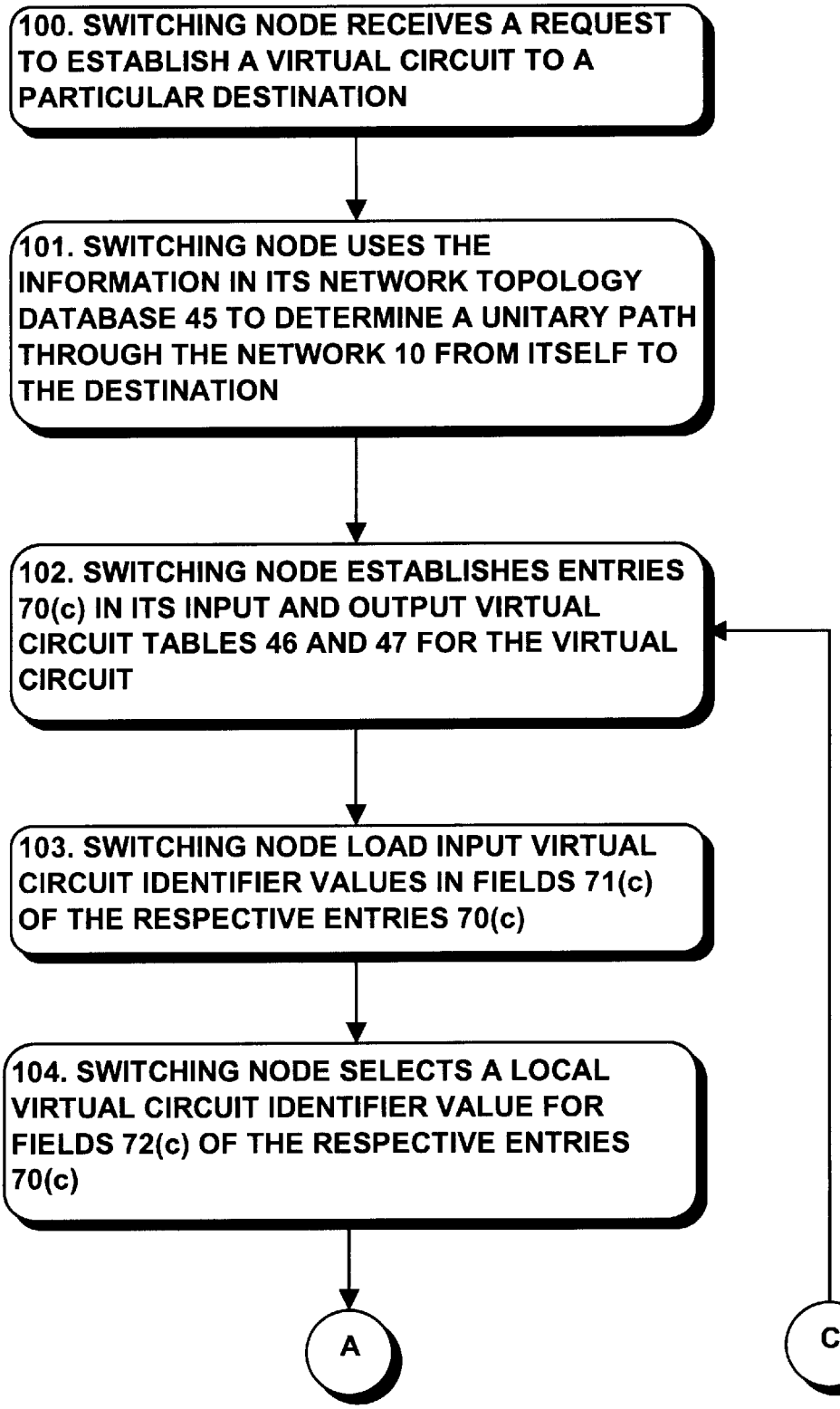
FIG. 6 is a flowchart detailing operations performed by the network in connection with establishment of a unitary virtual circuit through the network over communication links which may be of diverse service types.
Figure 6A:
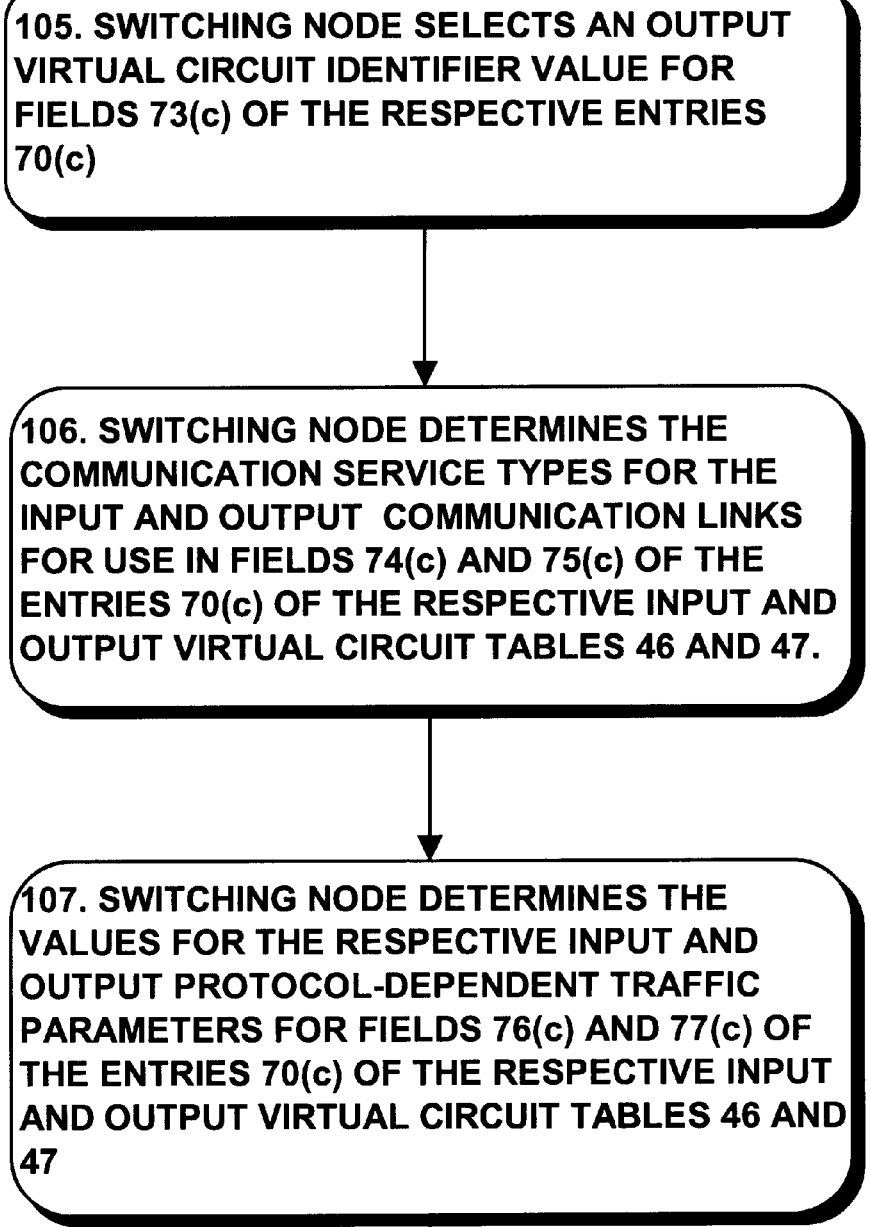
Figure 6B:
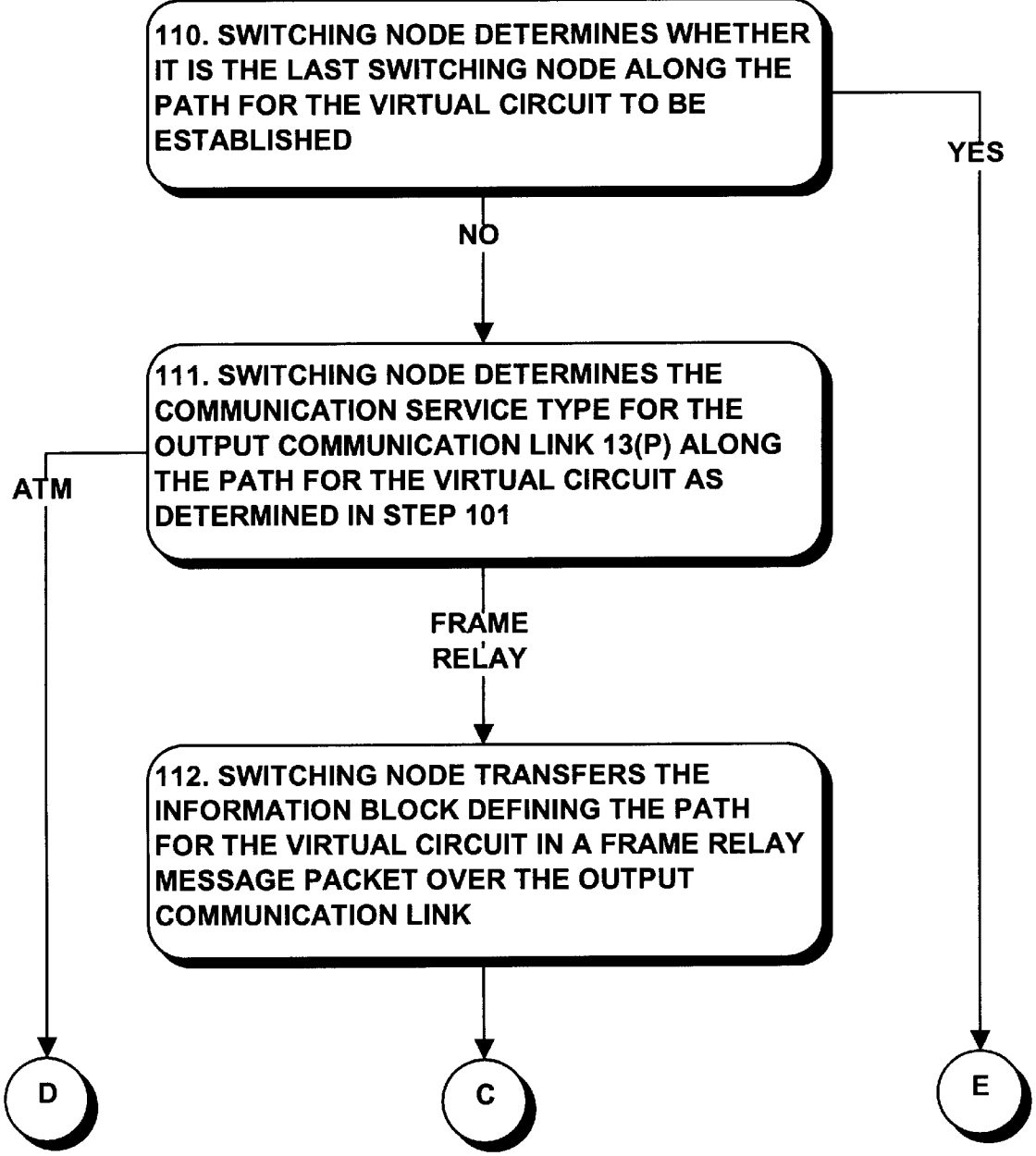
Figure 6C:
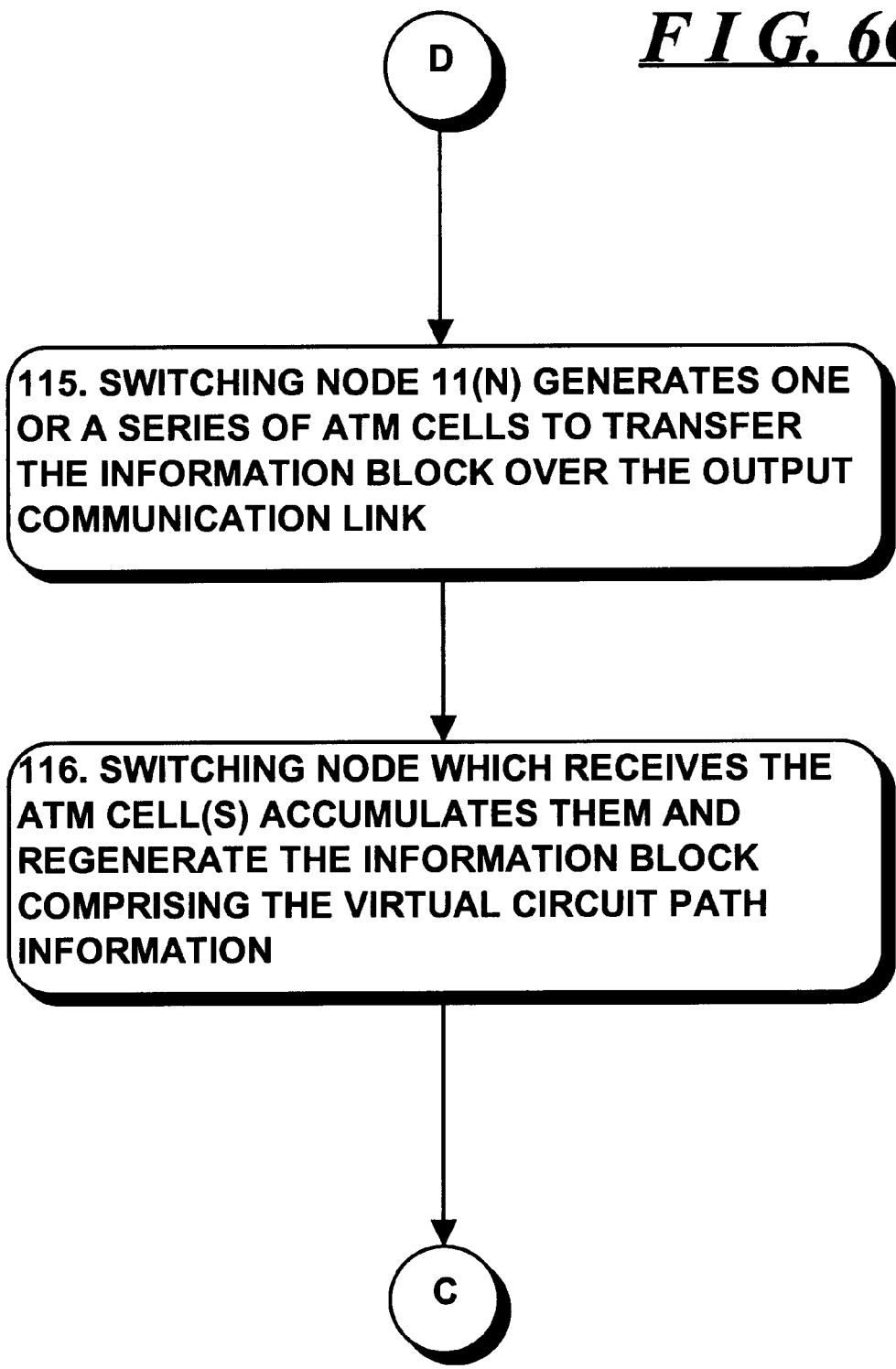
Figure 6D:
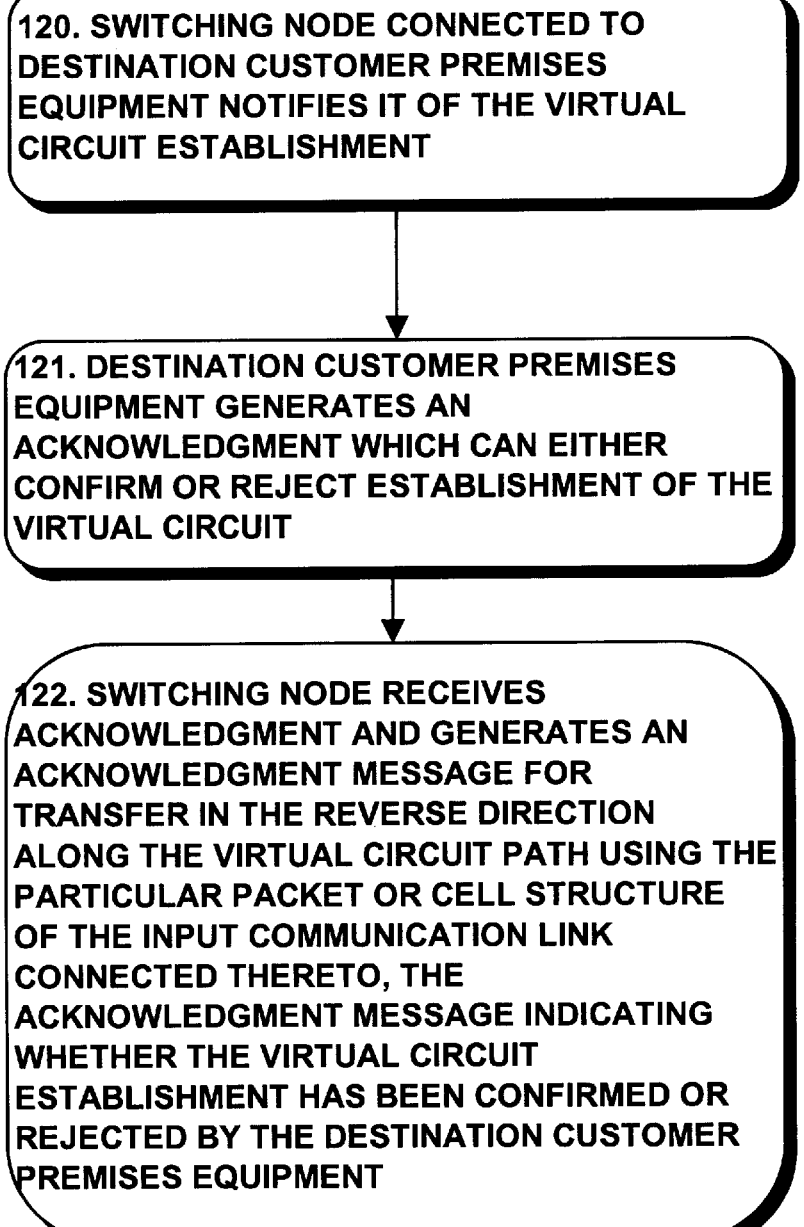

In addition, an illustrative switching node 11(n) for providing a unitary virtual circuit in connection with communication links of diverse service types will be described in detail in connection with FIGS. 3 through 5, and operations performed by the switching nodes 1(n) in connection with establishment of a unitary virtual circuit over communication links of diverse service types will be described in connection with FIG. 6.

In connection with the first scenario noted above, it will be assumed that customer premises equipment 12(1), connected to switching node 11(1), and customer premises equipment 12(5), connected to switching node 11(5) perform information transfers therebetween, over (i) a unitary virtual circuit defining a path from switching node 11(1) to switching node 11(5) (for transfers from customer premises equipment 12(1) to customer premises equipment 12(5)), and (ii) another unitary virtual circuit defining a path from switching node 11(5) to switching node 11(1) (for transfers from customer premises equipment 12(5) to customer premises equipment 12(1)) with both virtual circuits extending through switching node 11(3) and over communication links 13(9) and 13(15).

In this scenario, it will be assumed that customer premises equipment 12(1) transmits and receives message packets in the form of frame virtual circuit packets containing blocks of information which may vary in length. In addition, it will be assumed that customer premises equipment 12(5) transmits and receives message packets in the form of fixed-length ATM cells. It will further be assumed that the switching nodes 11(1) and 11(3) transfer information over communication link 13(9) in the form of variable-length frame virtual circuit packets, and that switching nodes 11(3) and 11(5) transfer information over communication link 13(15) in the form of fixed-length ATM cells.

In this first scenario, the "intermediate" switching node 11(3) (that is, the switching node along the path of the virtual circuit between the switching nodes 11(1) and 11(5) connected to the source and destination customer premises equipment 12(1) and 12(5)) implements an inter-working function ("IWF") between the frame relay type of communication service and the ATM type of communication service. The IWF implemented by the switching node 11(3) is used during establishment of the virtual circuits so that various communications parameters for the respective types of communications services, which can differ as between the two types of communications services, are appropriately matched. In addition, the IWF is used when the switching node 11(3) receives frame virtual circuit packets from the communication link 13(9) to enable the switching node 11(3) to generate ATM cells for transfer over communication link 13(15) to switching node 11(5), and also when the switching node 11(3) receives ATM cells from the communication link 13(15) to enable the switching node 11(3) to generate frame virtual circuit packets for transfer over the communication link 13(9) to the switching node 11(1).

Thus, if the customer premises equipment 12(1) is to transfer a block of information to the customer premises equipment 12(5) over the virtual circuit as described above, it will generate a frame virtual circuit packet including the information block and transfer it (that is, the frame virtual circuit packet) over communication link 13(1) to the switching node 11(1). The switching node 11(1), in turn, will receive the frame virtual circuit packet and transfer it over communication link 13(9) to the switching node 11(3). Switching node 11(3) will receive the frame virtual circuit packet and convert the frame virtual circuit packet to one or a series of ATM cells, which it (that is, the switching node 11(3)) will transfer over the communication link 13(15) to the switching node 11(5). The switching node 11(5), in turn, will transfer the ATM cells to the customer premises equipment 12(5), which can aggregate all of the cells related to the information block that was originally transferred in the frame relay virtual circuit packet thereby to regenerate the information block.

It will be appreciated that, if the amount of information in the information block contained in the frame virtual circuit packet generated by customer premises equipment 12(1) can be accommodated in a single ATM cell, the switching node 11(3) need only generate a single ATM cell from the frame virtual circuit packet which it receives over the communication link 13(9). On the other hand, if the amount of information in the information block contained in the frame virtual circuit packet will not be accommodated in a single ATM cell, the switching node 11(3) will need to generate a series of ATM cells to accommodate the information block which it receives over the communication link 13(9). As will be described below in more detail in connection with FIG. 2, (i) the ATM cells include an "end of packet" flag which identifies the end of a series of ATM cells which contain a block of information, and the destination customer premises equipment 12(5) can use the end of packet flag to identify each series of ATM cells which contains the information block from a frame virtual circuit packet generated by the customer premises equipment 12(1); and (ii) if the amount of information in the information block contained in the frame virtual circuit packet generated by the customer premises equipment 12(1) is not an even multiple of the amount of information contained in a ATM cell, a portion of the last ATM cell will be empty; in that case, the destination customer premises equipment 12(5) can determine the amount of information in the block with reference to length information which is included with the information block in the ATM cell(s) generated by the switching node 11(3).

On the other hand, if the customer premises equipment 12(5) is to transfer a block of information to the customer premises equipment 12(1) over the virtual circuit as described above, it will generate one or more ATM cells including the information block and transfer them (that is, the ATM cells) over communication link 13(5) to the switching node 11(5). The switching node 11(5), in turn, will receive the ATM cell(s) and transfer it or them over communication link 13(15) to the switching node 11(3). Switching node 11(3) will receive the ATM cell(s) and convert it or them to a frame virtual circuit packet, which it (that is, the switching node 11(3)) will transfer over the communication link 13(9) to the switching node 11(1). The switching node 11(1), in turn, will transfer the frame virtual circuit packet to the customer premises equipment 12(1), which can regenerate the information block from the frame virtual circuit packet. As above, if the amount of information in the information block to be transferred by customer premises equipment 12(5) can be accommodated in a single ATM cell, the customer premises equipment 12(5) need only generate a single ATM cell to accommodate the information block. On the other hand, if the amount of information in the information block to be transferred cannot be accommodated in a single ATM cell, the customer premises equipment 12(5) will need to generate a series of ATM cells to accommodate the information block. As will be described below in more detail in connection with FIG. 2, (iii) the ATM cells include an "end of packet" flag which identifies the ATM cell or end of a series of ATM cells which contains a block of information, and the switching node 11(3) can use the end of packet flag to identify the ATM cell or series of ATM cells which contains the information block to be transferred, and generate therefrom a frame virtual circuit packet containing the information block; and, (iv) if the amount of information in the information block to be transferred by the customer premises equipment 12(5) is not an even multiple of the amount of information contained in a ATM cell, a portion of the last ATM cell will be empty; in that case, the switching node 11(3) can determine the amount of information in the block, and to be transferred in a single frame virtual circuit packet, with reference to length information which the customer premises equipment 12(5) transfers in the ATM cell or cells, and which will be used by the switching node 11(3) in generating the frame virtual circuit packet.

In connection with the second scenario, it will be assumed that customer premises equipment 12(1), connected to switching node 11(1), and customer premises equipment 12(4), connected to switching node 11(4) perform information transfers therebetween, over (i) a unitary virtual circuit defining a path from switching node 11(1) to switching node 11(4) (for transfers from customer premises equipment 12(1) to customer premises equipment 12(4)), and (ii) another unitary virtual circuit defining a path from switching node 11(4) to switching node 11(1) (for transfers from customer premises equipment 12(4) to customer premises equipment 12(1)) with both virtual circuits extending through switching node 11(2) and over communication links 13(10) and 13(12).

In this second scenario, it will also be assumed that customer premises equipment 12(1) transmits and receives message packets in the form of frame virtual circuit packets, and that customer premises equipment 12(4) transmits and receives message packets in the form of fixed-length ATM cells. It will further be assumed that the switching nodes 11(1) and 11(2) transfer information over communication link 13(10) in the form of ATM cells, and that switching nodes 11(2) and 11(4) also transfer information over communication link 13(12) in the form of fixed-length ATM cells. In this example, the switching node 11(1) implements the interworking function ("IWF") between the frame relay type of communication service and the ATM type of communication service. Thus, if the customer premises equipment 12(1) is to transfer a block of information to the customer premises equipment 12(4) over the virtual circuit as described above, it will generate a frame virtual circuit packet including the information block and transfer it (that is, the frame virtual circuit packet) over communication link 13(1) to the switching node 11(1). The switching node 11(1), in turn, will receive the frame virtual circuit packet convert the frame virtual circuit packet to one or a series of ATM cells, which it (that is, the switching node 11(1)) will transfer over the communication link 13(10) to the switching node 11(2). The switching node 11(2) will transfer the ATM cells to the switching node 11(4), which, in turn, will transfer the ATM cells to the customer premises equipment 12(4). The customer premises equipment 12(4) can aggregate all of the cells related to the information block that was originally transferred in the frame relay virtual circuit packet thereby to regenerate the information block.

As with the first scenario, if the amount of information in the information block contained in the frame virtual circuit packet generated by customer premises equipment 12(1) can be accommodated in a single ATM cell, the switching node 11(1) need only generate a single ATM cell from the frame virtual circuit packet which it receives over the communication link 13(1). On the other hand, if the amount of information in the information block contained in the frame virtual circuit packet cannot be accommodated in a single ATM cell, the switching node 11(1) will generate a series of ATM cells to accommodate the information block which it receives over the communication link 13(1). Thus, (i) the ATM cells generated by the switching node 11(1) include an "end of packet" flag which identifies the end of a series of ATM cells which contain a block of information, and the destination customer premises equipment 12(4) can use the end of packet flag to identify each series of ATM cells which contains a respective the information block from a frame virtual circuit packet generated by the customer premises equipment 12(1); and (ii) if the amount of information in the information block contained in the frame virtual circuit packet generated by the customer premises equipment 12(1) is not an even multiple of the amount of information contained in a ATM cell, a portion of the last ATM cell will be empty; in that case, the destination customer premises equipment 12(4) can determine the amount of information in the block with reference to length information which is included with the information block in the ATM cell(s) generated by the switching node 11(1).

On the other hand, if the customer premises equipment 12(4) is to transfer a block of information to the customer premises equipment 12(1) over the virtual circuit as described above in connection with the second example, it (that is, customer premises equipment 12(4)) will generate one or more ATM cells including the information block and transfer them (that is, the ATM cells) over communication link 13(4) to the switching node 11(4). The switching node 11(5) will receive the ATM cell(s) and transfer it or them over communication link 13(12) to the switching node 11(2), which, in turn, will transfer it or them over communication link 13(10) to switching node 11(1). Switching node 11(1) will receive the ATM cell(s) and convert it or them to a frame virtual circuit packet, which it (that is, the switching node 11(1)) will transfer over the communication link 13(1) to the customer premises equipment 12(1), which can regenerate the information block from the frame virtual circuit packet.

As above, if the amount of information in the information block to be transferred by customer premises equipment 12(4) can be accommodated in a single ATM cell, the customer premises equipment 12(4) need only generate a single ATM cell from the information block to be transferred. On the other hand, if the amount of information in the information block to be transferred cannot be accommodated in a single ATM cell, the customer premises equipment 12(4) will need to generate a series of ATM cells to accommodate the information block. Thus, (iii) the ATM cells include an "end of packet" flag which identifies the ATM cell or end of a series of ATM cells which contains a block of information, and the switching node 11(1) can use the end of packet flag to identify the ATM cell or series of ATM cells which contains the information block to be transferred, and generate therefrom a frame virtual circuit packet containing the information block; and, (iv) if the amount of information in the information block to be transferred by the customer premises equipment 12(4) is not an even multiple of the amount of information contained in a ATM cell, a portion of the last ATM cell will be empty; in that case, the switching node 11(1) can determine the amount of information in the block, and to be transferred in a single frame virtual circuit packet, with reference to length information which the customer premises equipment 12(4) transfers in the ATM cell or cells, and which will be used by the switching node 11(1) in generating in the frame virtual circuit packet.

In connection with the third scenario, it will be assumed that customer premises equipment 12(1), connected to switching node 11(1), and customer premises equipment 12(3), connected to switching node 11(4) perform information transfers therebetween, over (i) a unitary virtual circuit defining a path from switching node 11(1) to switching node 11(4) (for transfers from customer premises equipment 12(1) to customer premises equipment 12(3)), and (ii) another unitary virtual circuit defining a path from switching node 11(3) to switching node 11(1) (for transfers from customer premises equipment 12(3) to customer premises equipment 12(1)) with both virtual circuits extending through switching node 11(2) and over communication links 13(10) and 13(12).

In this third scenario, it will be assumed that both customer premises equipment 12(1) and customer premises equipment 12(3) transmit and receive message packets in the form of frame virtual circuit packets. As above, it will be assumed that the switching nodes 11(1) and 11(2) transfer information over communication link 13(10) in the form of ATM cells, and that switching nodes 11(2) and 11(4) also transfer information over communication link 13(12) in the form of ATM cells. In this example, both switching nodes 11(1) and 11(4) implement the interworking function ("IWF") between the frame relay type of communication service and the ATM type of communication service. Thus, if the customer premises equipment 12(1) is to transfer a block of information to the customer premises equipment 12(3) over the virtual circuit as described above in connection with the third example, it will generate a frame virtual circuit packet including the information block and transfer it (that is, the frame virtual circuit packet) over communication link 13(1) to the switching node 11(1). The switching node 11(1), in turn, will receive the frame virtual circuit packet and convert it (that is, the frame virtual circuit packet) to one or a series of ATM cells, which it (that is, the switching node 11(1)) will transfer over the communication link 13(10) to the switching node 11(2). The switching node 11(2) will transfer the ATM cells to the switching node 11(4), which will receive the ATM cell(s) and convert it or them to a frame virtual circuit packet, which it (that is, the switching node 11(4)) will transfer over the communication link 13(3) to the customer premises equipment 12(3). The customer premises equipment 12(3), in turn, can regenerate the information block from the frame virtual circuit packet.

As with the preceding scenarios, if the amount of information in the information block contained in the frame virtual circuit packet generated by customer premises equipment 12(1) can be accommodated in a single ATM cell, the switching node 11(1) need only generate a single ATM cell from the frame virtual circuit packet which it transfers over the communication link 13(10). On the other hand, if the amount of information in the information block contained in the frame virtual circuit packet cannot be accommodated in a single ATM cell, the switching node 11(1) will generate a series of ATM cells to accommodate the information block which it receives over the communication link 13(1). Thus, (i) the ATM cells generated by the switching node 11(1) include an "end of packet" flag which identifies the end of a series of ATM cells which contain a block of information, and the switching node 11(4) connected to the destination customer premises equipment 12(3) can use the end of packet flag to identify each series of ATM cells which contains a respective the information block from a frame virtual circuit packet generated by the customer premises equipment 12(1); and (ii) if the amount of information in the information block contained in the frame virtual circuit packet generated by the customer premises equipment 12(1) is not an even multiple of the amount of information contained in a ATM cell, a portion of the last ATM cell will be empty; in that case, the switching node 11(4) can determine the amount of information in the block with reference to length information which is included with the information block in the ATM cell(s) generated by the switching node 11(1).

Similar operations are performed by the customer premises equipment 12(3) and 12(1) and switching nodes 11(4), 11(2) and 11(1) in connection with transfers over the virtual circuit constructed in the opposite direction.

In connection with the fourth scenario, it will be assumed that customer premises equipment 12(4), connected to switching node 11(4), and customer premises equipment 12(6), connected to switching node 11(6) perform information transfers therebetween, over (i) a unitary virtual circuit defining a path from switching node 11(4) to switching node 11(6) (for transfers from customer premises equipment 12(4) to customer premises equipment 12(6)), and (ii) another unitary virtual circuit defining a path from switching node 11(6) to switching node 11(4) (for transfers from customer premises equipment 12(6) to customer premises equipment 12(4)) with both virtual circuits extending through switching node 11(3) and over communication links 13(13) and 13(16).

In this fourth scenario, it will be assumed that both customer premises equipment 12(1) and customer premises equipment 12(3) transmit and receive message packets in the form of ATM cells, and that switching nodes 11(4) and 11(3) and switching nodes 11(3) and 11(6) transfer information over respective communication links 13(10) and 13(16) in the form of frame virtual circuit packets. In this example, both switching nodes 11(4) and 11(6) implement the interworking function ("IWF") between the ATM type of communication service and the frame relay type of communication service. Thus, if the customer premises equipment 12(4) is to transfer a block of information to the customer premises equipment 12(6) over the virtual circuit as described above, it will generate one or more ATM cell(s) including the information block and transfer it or them (that is, the ATM cells) over communication link 13(4) to the switching node 11(4). The switching node 11(4), in turn, will convert the ATM cell(s) to a frame virtual circuit packet and transfer it (that is, the frame virtual circuit packet) over communication link 13(13) to the switching node 11(3), which, in turn, will forward the frame virtual circuit packet over communication link 13(16) to switching node 11(6). The switching node 11(6) will receive the frame virtual circuit packet and generate therefrom one or more ATM cells for transfer over communication link 13(6) to the customer premises equipment 12(6), which, in turn, can regenerate the information block from the ATM cell(s).

As with the preceding examples, if the amount of information in the information block to be transferred by customer premises equipment 12(4) can be accommodated in a single ATM cell, it (that is, customer premises equipment 12(4)) will transfer only a single ATM cell for the information block, and the switching node 11(4) will use the single ATM cell in generating the frame virtual circuit packet. On the other hand, if the amount of information in the information block to be transferred cannot be accommodated in a single ATM cell, the switching node 11(4) will generate a series of ATM cells to accommodate the information block which it receives over the communication link 13(1). Thus, (i) the ATM cells generated by the customer premises equipment 12(4) include an "end of packet" flag which identifies the end of a series of ATM cells which contain a block of information, It and the switching node 11(4) can use the end of packet flag to identify each series of ATM cells which contains a respective the information block to be transferred by the customer premises equipment 12(4); and (ii) if the amount of information in the information block to be transferred is not an even multiple of the amount of information contained in a ATM cell, a portion of the last ATM cell will be empty; in that case, the switching node 11(4) can determine the amount of information in the block, to be used in generating the frame virtual circuit packet, with reference to length information which the customer premises equipment 12(4) transfers in the ATM cell(s) generated by the switching node 11(4).

Similarly, when the switching node 11(6) receives the frame virtual circuit packet from the communication link 13(16), (i) the switching node 11(6) will generate ATM cells to include an "end of packet" flag which identifies the end of a series of ATM cells which contain the information from the frame virtual circuit packet, and the customer premises equipment 12(6) can use the end of packet flag to identify each series of ATM cells which contains a respective the information block to be transferred by the customer premises equipment 12(4); and (ii) if the amount of information in the information block to be transferred is not an even multiple of the amount of information contained in a ATM cell, a portion of the last ATM cell will be empty; thus, the switching node 11(6) will provide length information with the information block in the ATM cells which the customer premises equipment 12(6) can use to determine the amount of information in the block.

Similar operations are performed by the customer premises equipment 12(6) and 12(4) and switching nodes 11(6), 11(3) and 11(4) in connection with transfers over the virtual circuit constructed in the opposite direction.

It will be appreciated that the network 10 may perform more complex scenarios if, for example, a virtual circuit between two customer premises equipment 12(*m*) is formed over a path through switching nodes 11(*n*) over which several frame virtual circuit packet/ATM cell conversions are required. If, for example, a virtual circuit between customer premises equipment 12(1) and 12(5) is constructed through switching nodes 11(1), 11(2), 11(4), 11(3) and 11(5), over communication links 13(1), 13(10), 13(12), 13(13), 13(15) and 13(5) (in that order), it will be appreciated that, for frame virtual circuit packets transferred by customer premises equipment 12(1) over communication link 13(1):

(i) switching node 11(1) will convert each frame virtual circuit packet received from customer premises equipment 12(1) into one or a series of ATM cells for transfer over communication link 13(10) to switching node 11(2), (ii) switching node 11(2) will couple the ATM cells received from communication link 13(10) onto communication link 13(12), (iii) switching node 11(4) will receive the one or series of ATM cells related to each frame virtual circuit packet and form a frame virtual circuit packet therefrom for transfer over communication link 13(13), (iv) switching node 11(3) will convert each frame virtual circuit packet received from communication link 13(13) to one or a series of ATM cells for transfer over communication link 13(15), and (v) switching node 11(5) will receive the ATM cells from communication link 13(15) and transfer them over communication link 13(5) to customer premises equipment 12(5).

On the other hand, for a series of ATM cells related to an information block transferred by customer premises equipment 12(5) over communication link 13(5):

(i) switching node 11(5) will receive the series of ATM cells from communication link 13(5) and transfer them over communication link 13(15) to switching node 11(3);

(ii) switching node 11(3) will receive the series of ATM cells related to the information block to be transferred and covert them to a single frame virtual circuit packet for transfer over the communication link 13(13), (iii) switching node 11(4) will receive each frame virtual circuit packet from communication link 13(13) and convert it to one or a series of ATM cells for transfer over communication link 13(12);

(iv) switching node 11(2) will couple the ATM cells received from communication link 13(12) onto communication link 13(10); and (v) switching node 11(1) will receive the one or series of ATM cells from communication link 13(1) related to each frame virtual circuit packet and convert the one or series of ATM cells to a frame virtual circuit packet for transfer to customer premises equipment 12(1) over communication link 13(1).

Similar and more complex scenarios, and operations performed by the respective switching nodes 11(n), for transfers between customer premises equipment 12(m) in the network will be apparent to those skilled in the art.

Figure 2:
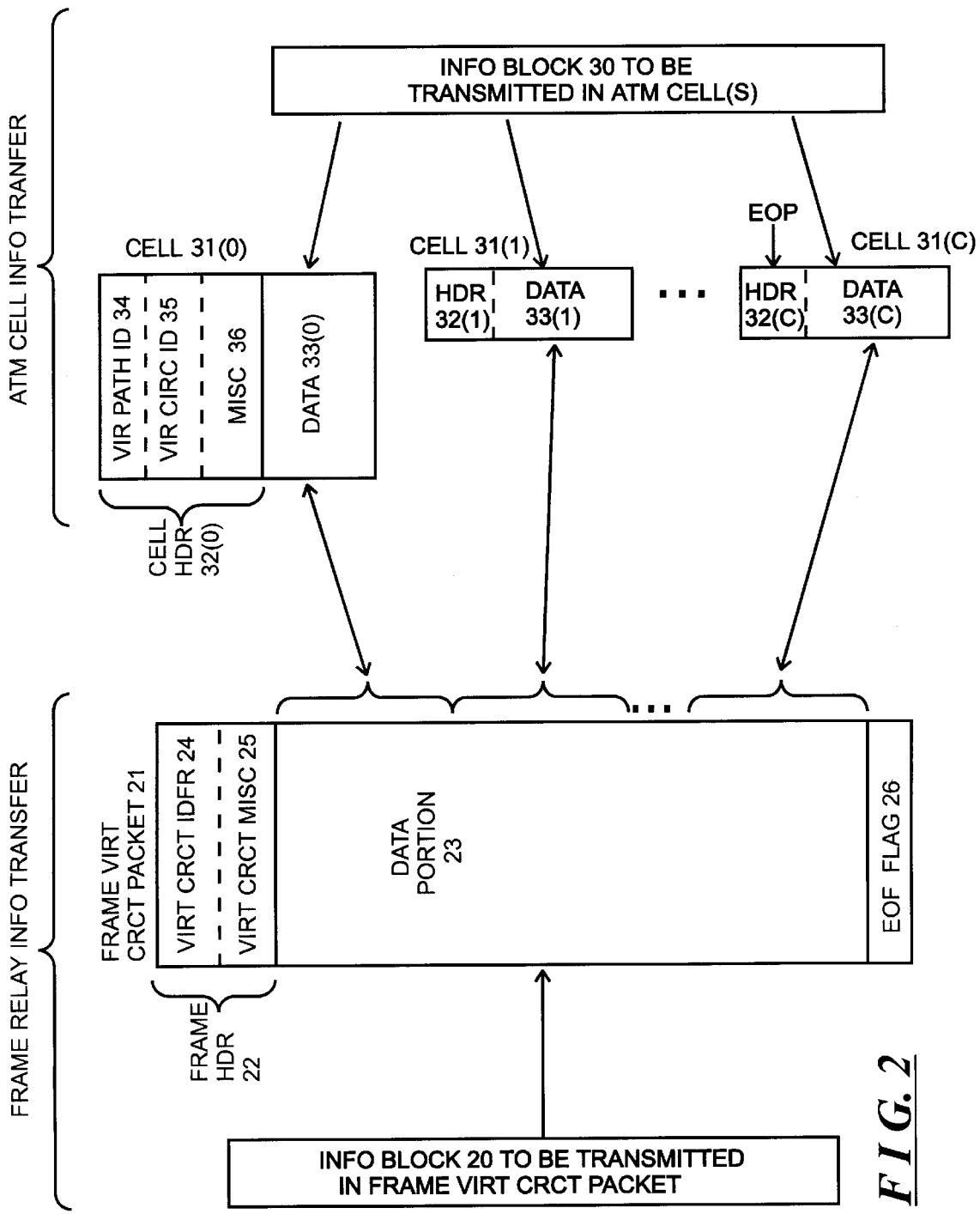
FIG. 2 is useful in understanding operations performed in transferring blocks of information using packets for the respective communications service types.

FIG. 2 illustrates the relationship among information blocks which may be transferred by the respective customer premises equipment 12(m) and the frame virtual circuit packets and ATM cells transferred in the network 10, and is useful in understanding operations performed by the switching nodes 11(n) in converting frame virtual circuit packets to one or a series of ATM cells, and from one or a series of ATM cells to frame virtual circuit packets. As shown in FIG. 2, when a customer premises equipment 12(m) has a block of data for transmission in a frame virtual circuit packet (represented in FIG. 2 by the block identified by reference numeral 20), the customer premises equipment 12(m) generates a frame virtual circuit packet identified by reference numeral 21. The frame virtual circuit packet 21 comprises a header portion 22 and a data portion 23. The data portion 23 includes the information block 20 to be transferred in the frame virtual circuit packet 21. The data portion 23 may also include other information, including, for example, a checksum which can be used to verify that the information in the frame virtual circuit packet 21 has been transferred correctly. The header portion 22 includes protocol information used in transferring the frame virtual circuit packet 21 through the network 10, including a virtual circuit identifier field 24 and a virtual circuit miscellaneous information field 25. The virtual circuit identifier field 24 is provided with a virtual circuit identifier value that identifies the particular virtual circuit over which the frame virtual circuit packet is to be transferred. The virtual circuit miscellaneous information field 25 includes other information used in transferring virtual circuit packets using the frame relay packet transfer protocol. An end-of-frame ("EOF") flag 26 comprises a predetermined bit pattern that identifies the end of the frame. The header portion 22 has a predetermined length, and a switching node 11(n) or customer premises equipment 12(m) can determine the amount of data in the data portion 23 in relation to the length of the frame virtual circuit packet 21 from the beginning to the end-of-frame flag 26.

On the other hand, when a customer premises equipment 12(m) has a block of information for transmission in one or a series of ATM cells (represented in FIG. 2 by the block identified by reference numeral 30), the customer premises equipment generates the one or series of ATM cells 31(0) through 31(C) (generally identified by reference numeral 31(c)). As shown in FIG. 2, each ATM cell 31(c) includes a header portion 32(c) and a data portion 33(c). Each data portion 33(c) includes a portion of the information block 30 to be transferred in the ATM cells 31(c), with the first ATM cell 31(0) including the first portion of the information block 30, the second ATM cell 31(1) including the second portion of the information block 30, and so forth. Generally, the "c-th" ATM cell 31(c) includes the "c-th" portion of the ATM block 30. In one of the ATM cells 31(c), illustratively the first ATM cell 31(0), the data portion 33(0) will also include length information that indicates the length of the information block 30 being transferred. In addition, the data portion 33(c) of each of the ATM cells 31(c) typically includes a checksum which can be used to verify that the information in the data portion 33(c) has been transferred correctly. The data portion 33(c) can also include information as to the ordering of the information contained therein in the information block being transferred.

The header portion 32(c) of each ATM cell 31(c) also includes protocol information for transferring the ATM cell through the network 10, including a virtual path identifier field 34, a virtual circuit identifier field 35, and a miscellaneous field 36. The virtual path identifier field 34 includes a virtual path identifier value, and the virtual circuit identifier field 35 includes a virtual circuit identifier value, which the switching nodes 11(n) use in connection with the transfer of the ATM cell 31(c) over the virtual circuit through the network 10. The miscellaneous field 36 contains miscellaneous protocol information, including an end-of-packet flag "EOP," that, when set, indicates that the ATM cell is the last ATM cell which contains information for the information block 30, and is otherwise clear. Accordingly, each switching node 11(n) which receives one or a series of ATM cells can identify the particular ATM cells which relate to a particular block of information being transferred, since the last ATM cell for an information block being transferred using a particular virtual circuit will have a set end-of-packet flag EOP, the next ATM cell for the same virtual circuit will have be the first ATM cell for another information block being transferred over the virtual circuit, containing the beginning of the information for the other information block. It will be appreciated that, since each ATM cell is of predetermined fixed length, the header portion 32(c) of each ATM cell does not need to contain cell length information. In addition, the miscellaneous field 36 can include a checksum which can be used to verify that the information in at least the header portion 32(c) has been transferred correctly.

As will be described below in connection with FIGS. 3 and 4, each switching node 11(n) maintains databases including information for each of the virtual circuits for which it (that is, the switching node 11(n)) forms part of the path for the virtual circuit, including information as to whether the input communication link 13(p) for the virtual circuit carries frame virtual circuit packets and the output communication link 13(p) for the virtual circuit carries ATM cells. If the switching node 11(n) determines from its databases that a received frame virtual circuit packet 21 is to be transmitted over a communication link 13(p) which carries ATM cells 31(c), it (that is, the switching node 11(n)) will convert the received frame virtual circuit packet 21 to one of a series of ATM cells 31(c) as part of its inter-working function "IWF."

When a switching node 11(n) converts a frame virtual circuit packet 21 to one or a series of ATM cells 31(c), it will generate the number of ATM cells 31(c) required to be generated to accommodate the data in the data portion 23. The switching node 11(n) can use the virtual circuit identifier information in virtual circuit identifier field 24 to identify the particular virtual circuit over which the frame virtual circuit packet 21 is being transmitted, and determine therefrom the particular virtual path identifier and virtual circuit identifier information to be used in field 34 and 35 of the header or headers 32(c) of the ATM cell(s) 31(c) being generated, and will provide the miscellaneous information required by the ATM cell transfer protocol, including the header check information, in the miscellaneous fields 36 of the ATM cell(s) 31(c) being generated. The switching node 11(n) will also set the end-of-packet field "EOP" of the last ATM cell 31(C) generated. In addition, the switching node 11(n) will distribute the data from the data portion 23 of the frame virtual circuit packet 21 among the data portion(s) 33(c) of the ATM cell(s) 31(c), and provide length information to indicate the amount of data in the data portion 33(C) of the last ATM cell 31(C). In addition, the switching node 11(n) can generate a checksum for the data in the data portion(s) 33(c) of the ATM cell(s) 31(c) for the last ATM cell 31(C).

As will further be described below in connection with FIGS. 3 and 4, each switching node 11(n) in its databases further includes information as to whether the input communication link 13(p) for the virtual circuit carries ATM cells 31(c) and the output communication link 13(p) for the virtual circuit carries frame virtual circuit packets 21. If the switching node 11(n) determines from its databases that one or a series of ATM cells 31(c) is to be transmitted over a communication link 13(p) which carries frame virtual circuit packets 21, it (that is, the switching node 11(n)) will convert the received one or series of ATM cells 31(c) to a frame virtual circuit packet 21 as part of its interworking function "IWF."

When a switching node 11(n) converts one or a series of ATM cells 31(c) associated with a block of information 30 to be transferred to a frame virtual circuit packet 21 as part of the interworking function "IWF," it will accumulate one or a series of ATM cells 31(c), following an ATM cell whose end-of-packet flag "EOP" is set, to the next ATM cell whose end-of-packet flag "EOP" is set, for a virtual circuit which will require it (that is, the switching node 11(n)) to generate a frame virtual circuit packet. The switching node 11(n) will generate the frame virtual circuit packet 21, and use the virtual path and virtual circuit information in fields 34 and 35 of the header portion 32(c) of that ATM cell to identify the virtual circuit identifier for virtual circuit identifier field 24 of the header portion 22. The switching node 11(n) will also load the data from the data portion(s) 33(c) of the received ATM cells. Finally, the switching node 11(n) will generate a checksum from the contents of the frame virtual circuit packet for inclusion in the frame virtual circuit packet 21, and append the end of frame flag 26 to the end of the frame virtual circuit packet 21 thereby to complete the packet 21 for transmission.

Figure 3:
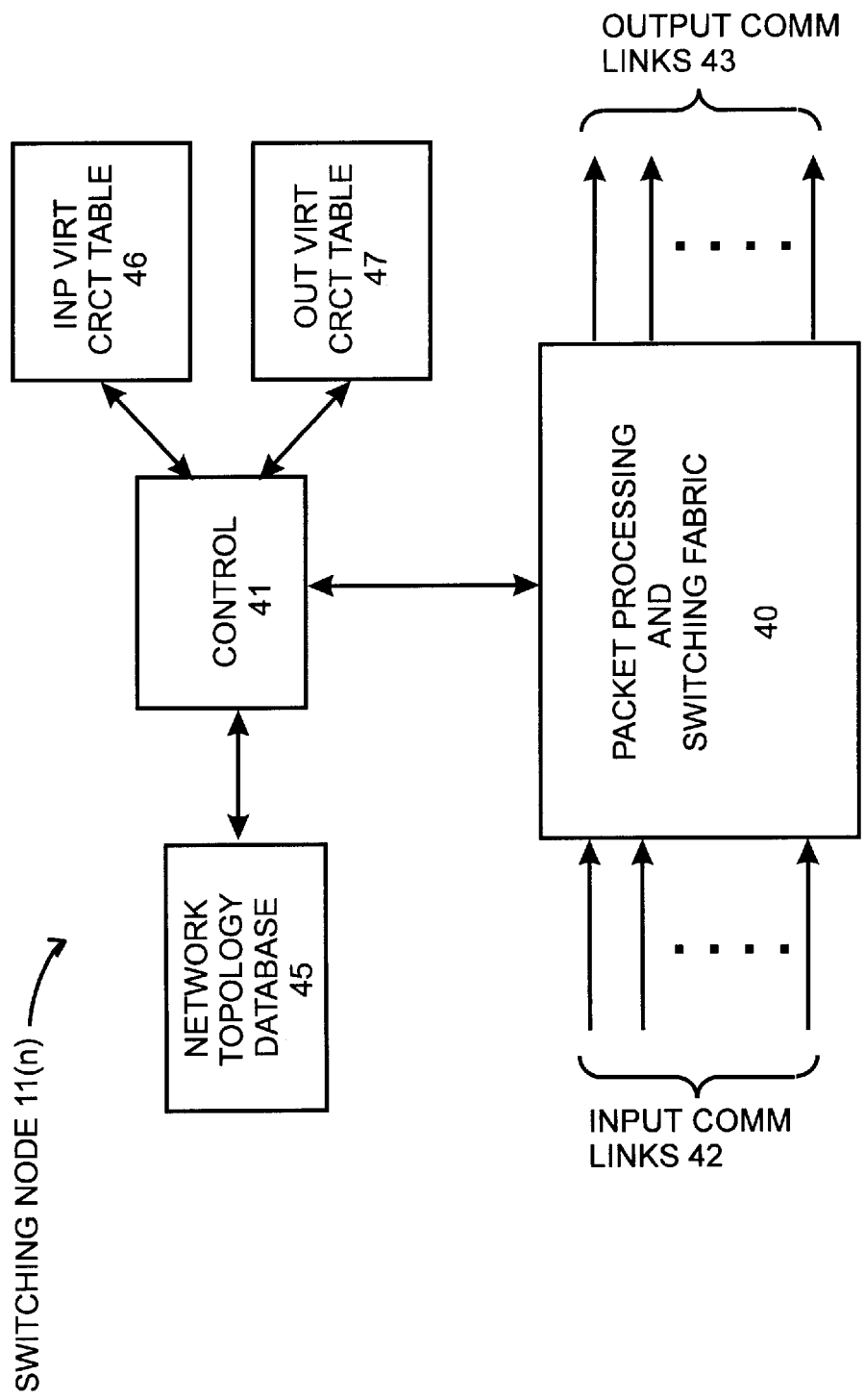
FIG. 3 depicts a functional block diagram of a switching node useful in the network depicted in FIG. 1.

A functional block diagram of a switching node 11(n) useful in connection with the invention is depicted in FIG. 3. With reference to FIG. 3, the switching node 11(n) includes a packet processing and switching fabric subsystem 40 and a control subsystem 41. Generally, the packet processing and switching fabric subsystem 40 receives message packets from ones of the communication links 13(p) connected thereto as input communication links generally identified by reference numeral 42, and transmits message packets over others of the communication links 13(p) connected thereto as output communication links generally identified by reference numeral 43, under control of the control subsystem 41. For any particular switching node 11(n), all of the communication links 13(p) may transfer information in the form of either frame virtual circuit packets 21 or ATM cells 31(c), or alternatively some of the communication links 13(p) may transfer information in the form of frame virtual circuit packets 21 and others of the communication links 13(p) may transfer information in the form of ATM cells 31(c). The control subsystem 41 controls the operations of the switching node 11(n), including establishment and dropping of virtual circuits, receipt and use of information from advertising message packets generated by other switching nodes 11(n') (n'≠n), generation and broadcast of advertising message packets to other switching nodes 11(n'), and transfer of message packets over the various virtual circuits in which the switching node 11(n) is included. Operations performed by one embodiment in connection with transfer of message packets over the respective communication links are generally conventional, and will not be described in detail herein.

It The control subsystem 41 makes use of several tables in connection with establishment of virtual circuits through the network 10 and for controlling the operations of the packet processing and switching fabric 40, including a network topology database 45, an input virtual circuit table 46 It and an output virtual circuit table 47. The network topology database 45 contains information describing the topology of the network 10, which the control subsystem 41 can use during establishment of virtual circuits therethrough. Using the network topology as defined by the network topology database 45, in response to a request to establish a virtual circuit from a customer premises equipment 12(m) connected to the respective switching node 11(n), the control subsystem 41 can determine optimal paths for virtual circuits from the customer premises equipment 12(m) as source customer premises equipment, to another customer premises equipment 12(m') as destination customer premises equipment, using operations defined by conventional optimal- or shortest-path algorithms. During establishment of each virtual circuit, as will be described below, the control subsystem 41 will store information for the virtual circuit, including virtual circuit identifier, input communication link and output communication link information, along with the service type for the respective input and output communication links, in the input virtual circuit table 46 and output virtual circuit table 47.

The control subsystem 41 can update the information in the network topology database 45 in response to advertising message packets which each of the switching nodes 11(n) generates and broadcasts throughout the network 10. Each advertising message packet provides local network topology information associated with the switching node that generated the advertising message packet, in particular identifying each the communication link 13(p) that is connected to the switching node that generated the advertising message packet, the other switching node that is connected thereto, and the communication link's operational status.

Both the input virtual circuit table 46 and the output virtual circuit table 47 contain information for each virtual circuit for which the switching node 11(n) forms part of the vial circuit's path through the network. The control subsystem 41 uses the information in the virtual circuit table 46 to identify a particular one of the output communication links 43 over which the virtual circuit packet is to be transmitted. In one particular embodiment, each switching node 11(n) can actually make use of several virtual circuit identifier values which identify each virtual circuit, including:

(i) an input virtual circuit identifier value for frame virtual circuit packets or ATM cells that are received from another switching node 11(n') (n'≠n), and (ii) an output virtual circuit identifier value that is used in transmitting each respective frame virtual circuit packet or ATM cell over one of the output communication links 43 to another switching node 11(n") (n'≠n', n), and the virtual circuit table 46 will identify each of the virtual circuit identifier values along with the identification of the output communication link 43 over which the virtual circuit packet 30 is to be transmitted. Typically, the virtual circuit identifier values are assigned on a communication link basis, so that the output virtual circuit identifier value for a switching node 11(n) connected to a particular communication link 13(p) will correspond to the input virtual circuit identifier value for the downstream switching node 11(n') (n'≠n) along the path for the virtual circuit in the network 10. The input and output virtual circuit identifier values for the virtual circuits associated with a particular communication link 13(p) will be unique, but the values may not be unique across all communication links 13(p) which are connected to a switching node 11(n). By providing input and output virtual circuit identifier values to identify respective virtual circuits in this manner, during establishment of a virtual circuit the switching nodes 11(n) can avoid having to determine a virtual circuit identifier value for each virtual circuit which is globally unique across the entire network 10.

In addition to the input and output virtual circuit identifier values, the input and output virtual circuit tables 46 and 47 may provide a "local" virtual circuit identifier for use internal to the switching node 11(n). If the local virtual circuit identifier value is provided, it can be used, for example, in controlling the transfer of a virtual circuit packet from an internal port (not separately shown in FIG. associated with the one of the input communication links 42 over which the switching node 11(n) receives the frame virtual circuit packet or ATM cell, to the internal port (also not separately shown in FIG. 3) which is associated with the output communication link 43 over which the switching node 11(n) is to transmit the frame virtual circuit packet or ATM cell.

The switching node 11(n) also uses the virtual circuit tables 46 and 47 to store values for protocol-dependent input and output traffic parameters associated with the communication services for the communications services used by the input communication links 42 and output communication links 43 for the respective virtual circuits. Traffic parameters include, for example, the rate at which bits are transferred over the respective communication link the sizes of protocol-determined portions of the frame virtual circuit packet 20 or ATM cell 3 (such as the sizes of the respective headers), and, for the ATM communication service, such parameters as the peak cell rate, sustained cell rate, maximum burst size, and cell delay variation tolerance. Relationships between parameters for the receptive types of communication services used in one embodiment of the invention are described in, for example, Appendix B.

FIG. 4 depicts details of the network topology database 45 used in one embodiment of the invention. With reference to FIG. 4, the network topology database 45 includes a number of switching node entries 50(1) through 50(n) (generally identified by reference numeral 50(n)) each of which is associated with one of the switching nodes 11(n) in the network. A switching node entry in the table maintained by switching node 11(n) is provided for each of the other switching nodes 11(n') (n'≠n) in the network, and one switching node entry may also be may be provided for the switching node 11(n) which maintains the network topology database 45.

Each switching node entry 50(n) in the network topology database 45 includes a switching node identifier field 51 and a plurality of stored communication link descriptors 52(1) through 52(r) (generally identified by reference numeral 52(r)). The switching node identifier field 51 contains an identifier for the particular one of the switching nodes in the network with which the switching node entry is associated. Each communication link descriptor 52(r) in the switching node entry 50(n) is associated with a respective one of the communication links 13(p) connected to the switching node 11(n) identified in the switching node identifier field 51, and contains information for the communication link 13(p) with which it is associated. The switching node entry 50(n) includes descriptors for all of the communication links 13(p) associated with the particular switching node 11(n), including communication links of the frame relay service type and communication links of the ATM service type.

In particular, each stored communication link descriptor 52(r) includes a communication link identifier field 53, a communication link service type field 54 and a communication link status field 55. The communication link identifier field 53 contains a communication link identifier that identifies the communication link 13(p) with which the communication link descriptor 52(r) is associated. The communication link service type field 54 of each stored communication link descriptor 52(r) contains an identifier identifying the type of service over the respective communication link 13(p), in particular identifying whether the communication link is used to transfer frame virtual circuit packets 21 or ATM cells 31(c). The communication link status field 54 of each communication link descriptor 52(r) contains the above-described status information for the respective communication link identified in communication link identifier field 53, indicating, for example, whether the respective communication link is operational or malfunctioning. The communication link status field 54 may also provide additional information, such as communications "cost," congestion, available bandwidth and other information which can be useful in determining an optimal path for virtual circuits established through the network 10.

FIG. 5 depicts details of the virtual circuit table 45 useful in one embodiment of the invention. With reference to FIG. 5, the virtual circuit table 45 also includes a number of entries 70(0) through 70(V) (generally identified by reference numeral 70(v)), each associated with one of the virtual circuits maintained by the switching node 11(n). Each entry 70(v) includes a plurality of fields, including an input virtual circuit identifier field 71(c), a local virtual circuit identifier field 72(c), an output virtual circuit identifier field 73(c), an input communication link service type field 74(c), an output communication link service type field 75(c), an input traffic parameters field 76(c), an output traffic parameters field 77(c), and an output communication link identifier field 78(c). The input virtual circuit identifier field, local virtual circuit identifier field, and output virtual circuit identifier field are used to store the input, local and output virtual circuit identifier values as described above. The input communication link service type and output communication link service type fields 74(c) and 75(c), in turn, identify the particular types of service for the input and output communication links, indicating whether the respective communication links are used for frame virtual circuit packets 21 or ATM cells 31(c). The input traffic parameters field 76(c) and output traffic parameters field 77(c) store the respective protocol-dependent input and output traffic parameters as described above and in Appendix B attached hereto. Finally, the output communication link identifier field 78(c) identifies the particular one of the output communication links 43 over which the frame virtual circuit packets 21 or ATM cells 31(c) associated with the virtual circuit are to be transmitted.

When the switching node 11(n) receives a frame virtual circuit packet 21 or ATM cell 31(c) which has a particular virtual circuit identifier in respective field 24 (in the case of a frame virtual circuit packet 21) or 35 (in the case of an ATM cell 31(c)), it will use the virtual circuit identifier to identify the entry 70(c) which has a corresponding received virtual circuit identifier value in field 71(c), thereby to identify the virtual circuit which is associated with the received frame virtual circuit packet 21 or ATM cell 31(c). From the input and output communication link service type identifiers in fields 74(c) and 75(c), the switching node 11(n) will also determine whether the service types of the respective ones of the input and output communication links 42 and 43 associated with the virtual circuit differ, and if so will perform a conversion operation as described above. In any case, for the frame virtual circuit packet 21 or ATM cell(s) 31(c) to be transmitted, the switching node 11(n) will use the transmitted virtual circuit identifier in field 73(c) as the virtual circuit identifier in field 24 or 35 of the respective frame virtual circuit packet 21 or ATM cell 31(c) to be transmitted, and transmit the respective frame virtual circuit packet 21 or ATM cell 31(c) over the output communication link identified by field 78(c).

The operations performed by the network in establishing a unitary virtual circuit through network 10 over communication links which may be of diverse service types will be described in connection with FIGS. 1 through 5 and the flow-chart in FIG. 6. Initially, a switching node 11(n) will receive a request to establish a virtual circuit to a particular destination, which includes the identification of the destination customer premises equipment 12($m_D$) and the switching node 11(n') connected thereto (step 100). It will be assumed here that the switching node 11(n') is a different switching node 11(n) (that is, it will be assumed that n'≠n). The virtual circuit establishment request received in step 100 may originate, for example, from a network administrator, or from customer premises equipment 12(m) connected to the particular switching node 11(n) which will operate as source customer premises equipment. In any case, after receiving a virtual circuit establishment request, the switching node 11(n) will use the information in its network topology database 45 to determine a unitary path through the network 10 from itself (that is, the switching node 11(n)) to the switching node 11(n') (step 101). The switching node 11(n) may use any conventional path-determination algorithm in determining the unitary path, including, for example, the well-known "Open Shortest Path First" ("OSPF") algorithm used in the TCP/IP Internet routing protocol.

The result of the path determination operations in step 101 is effectively information defining a series of output communication link identifiers identifying the series of output communication links 13($p_1$), 13($p_2$), ... 13($p_K$) (generally identified by reference numeral 13($p_k$)) between the switching node 11(n) and the destination customer premises equipment 12($m_D$), which, in turn, implicitly also identifies the series of switching nodes 11($n_1$), 11($n_2$), 11($n_{K-1}$) (generally identified by reference numeral 11($n_k$) between the switching node 11(n) and the destination customer premises equipment 12($m_D$). The communication link path information forms an information block 20, 30, which will be effectively transferred from switching node 11(n) to the switching node 11($n_{K-1}$) connected to the destination customer premises equipment 12($m_D$), with each switching node 11($n_k$) along the path, including switching node 11(n), establishing an entry 70(c) in its respective input and output virtual circuit tables 46 and 47 therefor.

More specifically, the switching node 11(n), after determining the path for the virtual circuit in step 101, will establish entries 70(c) in its input and output virtual circuit tables 46 and 47 for the virtual circuit (step 102) and load input virtual circuit identifier values in fields 71(c) of the respective entries 70(c) (step 103). In connection with step 103, if the virtual circuit establishment request included an input virtual circuit identifier value, the switching node 11(n) can use that value as the input virtual circuit identifier values in respective fields 71(c). On the other hand, if the virtual circuit establishment request did not include an input virtual circuit identifier value, the switching node 11(n) can select a virtual circuit identifier value that is unique for the communication link 13(p) connected to the source customer premises equipment 12($m_S$) to be associated with the virtual circuit. In addition, the switching node 11(n) will select a local virtual circuit identifier value for fields 72(c) of the respective entries 70(c) (step 104) and an output virtual circuit identifier value that is unique for the first communication link 13($p_1$) along the path determined in step 101, which will be loaded in fields 73(c) of the respective entries 70(c) (step 105).

After determining the virtual circuit identifier values and loading them in respective fields 71(c) through 73(c) of entries 70(c) of the respective virtual circuit tables 46 and 47 (steps 103 through 105), the switching node 11(n) can determine the communication service types for (i) the input communication link 13(p), which connects the switching node 11(n) to the source customer premises equipment 12($m_S$), and (ii) the output communication link 13($p_1$) (step 106), for use in fields 74(c) and 75(c) of the entries 70(c) of the respective input and output virtual circuit tables 46 and 47. The switching node 11(n) can use the network topology database 46 in performing step 106, in particular the communication link service type fields 54 of the communication link descriptors 51(r) for the respective communication links. In addition, the switching node 11(n) can determine the values for the respective input and output protocol-dependent traffic parameters for fields 76(c) and 77(c) of the entries 70(c) of the respective input and output virtual circuit tables 46 and 47 (step 107). Finally, the switching node 11(n) provides an identifier for the output communication link 13($p_1$) in the output communication link identifier field 78(c) of the entries 70(c) of the respective input and output virtual circuit tables 46 and 47 (step 108).

Following step 108, the switching node 11(n) determines whether it is the last switching node along the path for the virtual circuit to be established (step 110). As noted above, it is assumed here that switching node 11(n) is not the last switching node 11($n_{K-1}$) along the path, in which case switching node 11(n) will make a negative determination in that step. In that case, switching node 11(n) will determine the communication service type for the output communication link 13($p_1$) along the path for the virtual circuit as determined in step 101 (step 111). If the switching node 11(n) determines that the output communication link 13($p_1$) uses the frame relay communication service, it will transfer the information block defining the path for the virtual circuit in a frame relay message packet over the communication link 13($p_1$) (step 112). The frame relay message packet is generally similar to the frame virtual circuit packet 21 described above in connection with FIG. 2, except that the header portion 22 contains information which will identify the frame relay message packet as containing virtual circuit establishment information for use by the switching node 11($n_1$) which receives it, and the data portion 23 will include the information block comprising the virtual circuit path information.

On the other hand, if the switching node 11(n) determines in step 111 that the output communication link 13($p_1$) uses the ATM communication service, it will generate one or a series of ATM cells to transfer the information block over the communication link $13(p_1)$ (step 115). The ATM cell(s) are generally to the ATM cells described above in connection with FIG. 2, except that the header portion(s) 32 contains information which will identify the ATM cell as containing virtual circuit establishment information for use by the switching node $11(n_1)$ which receives it, and the data portion (s) 33 will include the information block comprising the virtual circuit path information. As in FIG. 2, the last ATM cell containing virtual circuit path information will have the end-of-packet "EOP" flag set. The switching node $11(n_1)$ which receives the ATM cell(s) generated in step 115 can accumulate them and regenerate the information block comprising the virtual circuit path information (step 116).

Following either step 112 or step 116, the switching node $11(n_1)$ will have the virtual circuit path information block as generated by switching node $11(n)$ in step 101. At that point, the switching node $11(n_1)$ can perform operations similar to those described above in connection with steps 102–108, 110–112 and 115–116 to establish the virtual circuit entries $70(c)$ in its respective input and output virtual circuit tables 46 and 47 and load the appropriate values therein (steps 102–108), determine whether it is the last switching node $11(n_{K-1})$ along the path for the virtual circuit (step (110), and, if not, forward the virtual circuit path information block to the next switching node $11(n_2)$ along the path (steps 111–112, 115–116). These operations will be repeated for each switching node $11(n_k)$ along the path until a switching node $11(n)$ makes a positive determination in step 110, thereby determining that it is the last switching node $11(n_{K-l})$ along the path.

When a switching node $11(n)$ makes a positive determination in step 110, thereby determining that it is the last switching node $11(n_{K-1})$ along the path, it will notify the destination customer premises equipment $12(m_D)$ over the communication link $13(p_K)$ interconnecting them of the virtual circuit establishment (step 120). The destination customer premises equipment $12(m_D)$ will generate an acknowledgment which can either confirm or reject establishment of the virtual circuit (step 121). In either case, the switching node $11(n_{K-1})$ will generate an acknowledgment message for transfer in the reverse direction along the virtual circuit path using the particular packet or cell structure of the communication link $13(p_{K-1})$ connected thereto (step 122), the acknowledgment message indicating whether the virtual circuit establishment has been confirmed or rejected by the destination customer premises equipment $12(m_D)$. If the acknowledgment from the destination customer premises equipment $13(m_D)$ rejected establishment of the virtual circuit, the switching node $11(n_{K-1})$ will also erase the entries $70(c)$ that it established for the virtual circuit in its input and output virtual circuit tables 46 and 47 (step 123).

The switching node $11(n_{K-1})$ and each successive switching node $11(n_{K-2})$, $11(n_{K-3})$, . . . , $11(n_1)$ along the path will receive the acknowledge message generated by the switching node $11(n_{K-1})$ and perform operations similar to those described above in connection with steps 122 and 123 to forward the acknowledge message and, if the acknowledgment rejected establishment of the virtual circuit, erase the entries $70(c)$ established for the virtual circuit in their respective input and output virtual circuit tables 46 and 47. When the originating switching node $11(n)$ receives the acknowledgment message (step 124), it will also determine whether it (that is, the acknowledgment message) rejects establishment of the virtual circuit, and if so will erase the entries $70(c)$ established for the virtual circuit in their respective input and output virtual circuit tables 46 and 47 (step 125). In either case, the originating switching node $11(n)$ will notify the source customer premises equipment $12(m_S)$ or the network administrator of the confirmation or rejection of the establishment of the virtual circuit (step 126). Thereafter, if the acknowledgment message confirmed establishment of the virtual circuit, it (that is, the virtual circuit) can be used to transfer information blocks as described above.

The invention provides a number of benefits. In particular, the invention provides an arrangement by which networks of various service types can be efficiently integrated, and to allow message packets of the respective service types to be transferred over unitary virtual circuits constructed through the network. This avoids the problem, which arose in prior networks, of requiring separate virtual circuits for each portion of a path through the network of a respective service type, which would need to be separately established and managed.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network for transferring information among a plurality of digital devices, said network comprising:

a plurality of switching nodes interconnected by communication links, each of said digital devices being connected to one of said switching nodes over additional ones of said communication links;

each said communication link transferring information in a predetermined one of a plurality of types of communication services, said network including at least one communication link of each service type;

the digital devices and switching nodes transferring information over virtual circuits, each virtual circuit extending from one said digital device, as an originating digital device, to another said digital device, as a terminating digital device, over a unitary virtual circuit path extending through at least one switching node, over a plurality of said communication links without regard to the service type of the ones of said communication links included in said unitary virtual circuit path; and said plurality of switching nodes able to convert information received on an input communication link in a structure defined by the communication service for said input communication link to a structure defined by the communication service for an output communication link if the communication service for said input and output communication links differ.

2. A network as defined in claim 1 in which at least one digital device comprises customer premises equipment.

3. A network as defined in claim 1 in which said originating digital device comprises a switching node.

4. The network as defined in claim 1 in which said terminating digital device comprises a switching node.

5. The network as defined in claim 1 in which:

said switching nodes transfer information over said communication links in information packets, each said information packet having a predetermined structure which is defined by the respective communication service for the respective communication link, and for each said virtual circuit defining said unitary virtual circuit path, each said switching node which receives an information packet over one of said communication links, as an input communication link performing a conversion operation to convert the received information packet from the structure defined by the communication service for the input communication link to the structure defined by the communication service for the output communication link if the communication service for the input and output communication link differs.

6. A network as defined in claim 5 in which at least one said switching node comprises:

A. a switching fabric for receiving received information packets from said input communication links and in response thereto selectively transferring information packets onto said output communication links;

B. a virtual circuit table for defining, for each of said virtual circuits for which said at least one switching node forms part of said virtual circuit path, the communication service type for each of said input and output communication links for the virtual circuit, and C. a control for, in response receipt by said switching fabric of an information packet for a said one of said virtual circuits, selectively performing a conversion operation in connection with said received information packet if the virtual circuit table indicates that the communication service type for the input communication link for the virtual circuit differs from the communication service type for the output communication link for the virtual circuit.

* * * * *

UNITED STATES PATENT AND TRADEMARK OFFICE
CERTIFICATE OF CORRECTION

PATENT NO. : 6,222,845 B1
DATED : April 24, 2001
INVENTOR(S) : Chikong Shue et al.

It is certified that error appears in the above-identified patent and that said Letters Patent is hereby corrected as shown below:

Column 4,
Line 15, "devices E1" should read -- devices --;
Line 19, "data lie thereto" should read -- data thereto --;
Line 21, "link," should read -- links, --;

Column 11,
Line 56, "It and" should read -- and --;

Column 16,
Line 13, "It The" should read -- The --;
Line 18, "It and" should read -- and --;
Line 52, "vial" should read -- virtual --;
Line 66, "(n'≠n','" should read -- (n"≠n', --;

Column 17,
Line 27, "FIG." should read -- FIG. 3) --; and

Column 19,
Line 49, "fink" should read -- link --.

Signed and Sealed this

Twelfth Day of March, 2002

Attest:

JAMES E. ROGAN
Attesting Officer
Director of the United States Patent and Trademark Office